United States Patent [19]

Louradour et al.

[11] Patent Number: 4,663,981

[45] Date of Patent: May 12, 1987

[54] ANTIVIBRATION SYSTEM FOR A MECHANICAL TRANSMISSIONS

[76] Inventors: Guy Louradour, 10 rue Marcelin Berthelot, 93100 Montreuil; Bernard Gironnet, 28 rue Paul Bert, 92150 Suresnes; Jean E. A. Redele, 11-13 rue Forest, 75018 Paris, all of France

[21] Appl. No.: 660,000

[22] Filed: Oct. 12, 1984

[51] Int. Cl.$^4$ ............................................. F16H 55/18
[52] U.S. Cl. ...................................... 74/440; 74/409; 74/411; 464/97
[58] Field of Search ................. 74/409, 440, 410, 411; 464/97

[56] References Cited

U.S. PATENT DOCUMENTS

| | | | |
|---|---|---|---|
| 1,828,305 | 10/1931 | Zeder et al. | 74/440 |
| 1,968,338 | 7/1934 | Earles et al. | 74/440 |
| 2,163,836 | 6/1939 | Haas | 74/440 |
| 2,737,056 | 3/1956 | Baumgartner | 74/440 |
| 3,020,775 | 2/1962 | Musser | 74/440 |
| 3,090,258 | 5/1963 | Zink et al. | 74/411 |
| 3,131,554 | 5/1964 | Hornschuch et al. | 74/440 |
| 3,141,313 | 7/1964 | Brickett et al. | 74/440 |
| 3,203,268 | 8/1965 | Manoni et al. | 74/411 |
| 3,303,713 | 2/1967 | Hicks | 74/411 |
| 3,399,549 | 9/1968 | Nagele | 74/440 |
| 3,633,441 | 1/1972 | Hicks | 74/411 |
| 4,083,094 | 4/1978 | Silvestri | 74/411 |

Primary Examiner—Allan D. Herrmann
Attorney, Agent, or Firm—Sughrue, Mion, Zinn, Macpeak, and Seas

[57] ABSTRACT

Between a drive unit (not shown) and a driven unit (not shown) there is a gear train (2,7) which includes tuned bars (1, 10) which are so dimensioned that, in operation, the nodes in the torsion vibration to which the system is subject are situated in said tuned bars.

5 Claims, 5 Drawing Figures

ANTIVIBRATION SYSTEM FOR A MECHANICAL TRANSMISSIONS

The present invention relates to an antivibration system for a mechanical gear transmission of the type including backlash takeup means or vibration damping means for avoiding noise and tooth breakages.

BACKGROUND OF THE INVENTION

In installations comprisng a motor unit, a step-up or step-down gear unit, and a driven unit, the gears may be rapidly destroyed due to torsion vibrations in the shafts of the drive train. This destruction is linked to loss of contact between the teeth of two intermeshing gear wheels. Such loss of contact may be caused by oscillatory movements of the components of the drive train. Loss of contact gives rise to noise and to rapid destruction of the teeth by continuous hammering when operating at certain dangerous speeds. To avoid loss of contact, it is necessary for the amplitude A of the oscillating torque to be less than the average drive torque $C_0$ (equal to the average delivered torque).

To avoid such loss of contact when the absolute value A of the oscillating torque amplitude is greater than the average drive torque $C_0$, proposals have been made to pre-stress the teeth by means of an internal torque $C_1$ which is added to the drive torque $C_0$, but within the gear means only. This is done by means of a backlash takeup gear wheel. Such a gear wheel includes a main wheel and a secondary wheel, both of which mesh with a drive gear wheel, but with only the main gear wheel being keyed to the output shaft, and with the main wheel and the secondary wheel being urged to rotate relative to each other by at least one spring. This arrangement can naturally be applied to the driving gear wheel rather than to the driven gear wheel, with both solutions being equivalent.

Unfortunately, such as arrangement is in many cases insufficient. Preferred embodiments of the present invention provide a transmission system capable of preventing loss of contact between meshed gear wheels in substantially all circumstances which are encountered in practice.

SUMMARY OF THE INVENTION

The present invention provides a mechanical transmission sytem including a gear train comprising at least one gear wheel which is constituted by two wheels mounted on a common shaft, said two wheels comprising a main gear wheel which fixed to the common shaft and which meshes with another gear wheel to transmit driving torque, and a secondary gear wheel for taking up backlash, said secondary gear wheel not being fixed to said common shaft, but meshing with said other gear wheel, said main gear wheel and said secondary gear wheel being resiliently urged to rotate relative to each other in such a manner as to maintain the teeth of said main gear wheel in contact with the teeth of said other gear wheel by setting up an internal torque, the improvement wherein a wedging and friction link is provided between said main wheel and said secondary wheel enabling said secondary wheel to rotate freely relative to said main wheel in the direction tending to bring the teeth of said main wheel into closer contact with the teeth of said other wheel, and imposing predetermined friction for rotation in the opposite direction of relative rotation.

Preferably, the system includes a drive unit, said gear train including said at least two intermeshed gear wheels, and a driven unit, with at least one of the drive-unit-to-gear-train and gear-train-to-driven-unit links including a resilient tuning bar of dimensions so chosen that the tuning bar is the seat, in operation, of a vibration node, and advantageously, the mechanical parts fixed to opposite ends of the, or each, tuning bar are in frictional contact with one another with an energy dissipating fitting interposed therebetween.

BRIEF DESCRIPTION OF THE DRAWINGS

Embodiments of the invention are described by way of example with reference to the accompanying drawings, in which.

MORE DETAILED DESCRIPTION

Figure 1:
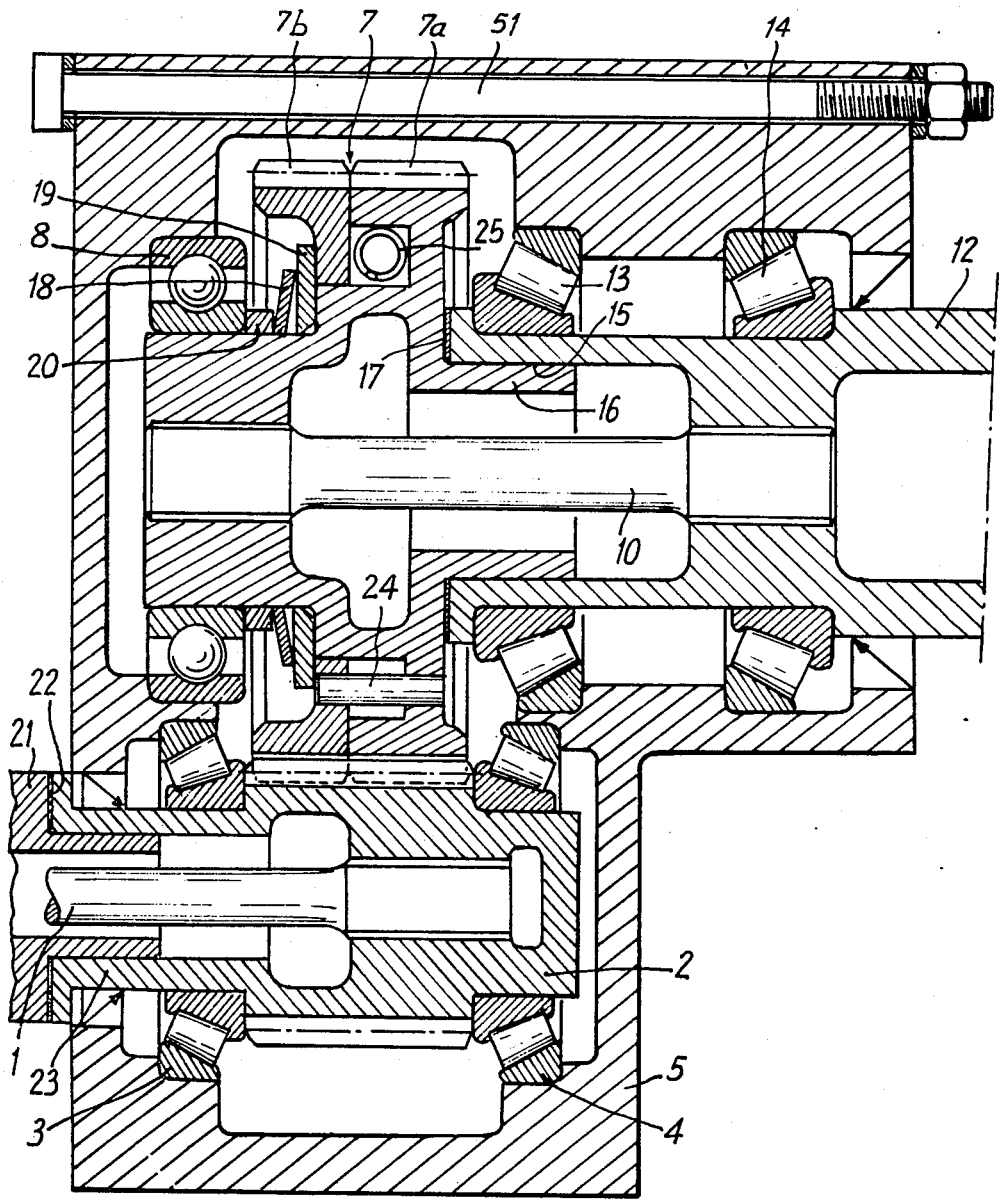
FIG. 1 is an axial section through a transmission system in accordance with the invention, the transmission comprising two meshed gear wheels and the section being on the plane passing through both of their axes.

The transmission system shown by way of example in FIGS. 1 to 4 comprises: a drive shaft 1; a drive gear wheel 2 fixed to the drive shaft 1; bearings 3 and 4 mounting the drive shaft 1 in a casing 5; an output gear wheel 7 comprising a main wheel 7a on an output shaft 10 together with a locking secondary wheel 7b for taking up backlash; a bearing 8 mounting the main wheel 7a in the casing 5 (with the secondary wheel 7b being mounted slidable relative to the main wheel and to the output shaft 10); and a first drive sleeve or driven unit 12 mounted to the output shaft 10. Naturally, the functions of the drive gear wheel and the driven gear wheel may be interchanged. The sleeve 12 is mounted in the casing by means of bearings 13, 14 and is axially slidable at 15 over a socket 16 which is fixed to the main wheel 7a. Further, the sleeve 12 and the main wheel 7a press against each other (across a radial plane or across any other suitable surface of revolution) via an energy-dissipating fitting 17. The secondary wheel 7b is pressed resiliently against the main wheel 7a, and the main wheel 7a is pressed resiliently against the sleeve 12 via the fitting 17 by means of an axial or longitudinal thrust spring 18 (sometimes known as a "Belleville washer") and a plane washer 19. The spring 18 also thrusts against a ring 20 which itself presses against a stop or bearing 8. A similar arrangement may be provided for the drive gear wheel 2 and a second drive sleeve or drive unit 21 which is keyed to the drive shaft 1 via an energy-dissipating fitting 22. The sleeve is engaged inside a socket 23 which is fixed to the drive gear wheel 2.

Figure 2:
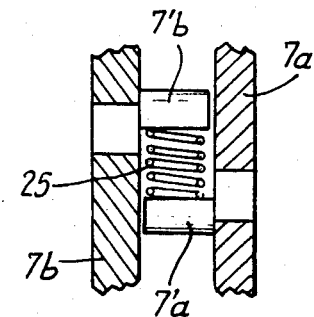
FIG. 2 is a cross section showing a detail of the FIG. 1 transmission system.

The main and secondary wheels 7a and 7b may be interconnected by resilient bars 24 as shown at the bottom of the wheels in FIG. 1, or else by springs 25 as shown at the top of the wheels in FIG. 1 and in FIG. 2, together with wedges 7'a and 7'b. The springs 25 (or in a variant the bars 24) resiliently urge the wheels 7a and 7b to rotate relative to each other in such a manner as to eliminate backlash between the gear wheels 2 and 7.

Figure 3:
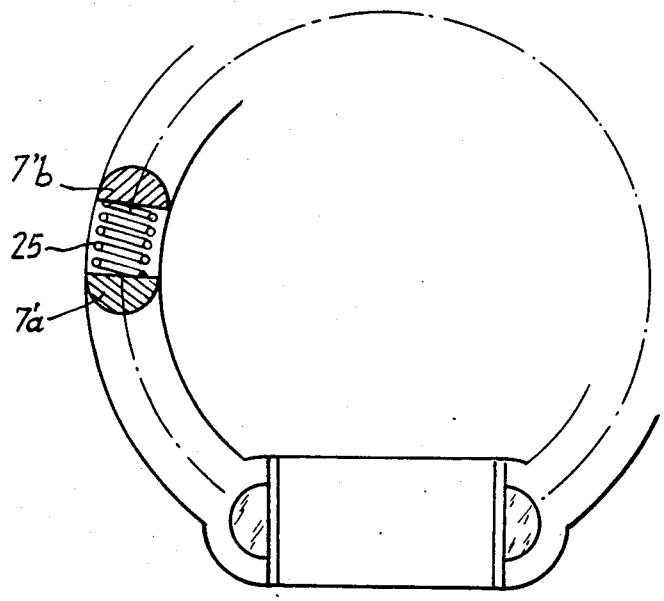
FIG. 3 is a section at rightangles to those of FIGS. 1 and 2 showing a second detail of the transmission system.
Figure 4:
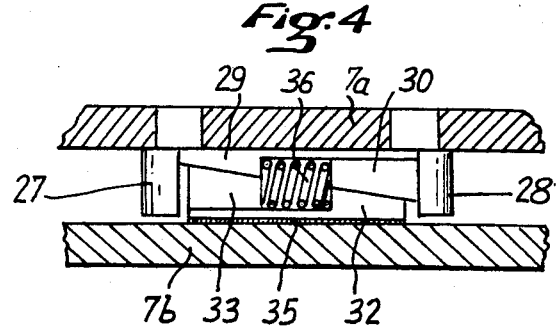
FIG. 4 is a section showing a third detail of the transmission system.

This is done by setting up a torque $C_1$ internal to the gear wheel 7 and which is added to the driving torque $C_0$. When there is no vibration, the pre-stressing torque $C_1$ is thus applied to the gearing. When there is vibration, an oscillating torque tends to separate the meshed teeth: this causes the main wheel 7a and the secondary wheel 7b to move relative to each other. Merely applying a pre-stress as described above is not always sufficient to prevent the gear wheels 2 and 7 losing contact; thus, in accordance with the invention, a wedging and friction link is provided as shown in FIGS. 3 and 4, to co-operate with at least one the resilient link such as shown in FIG. 2.

For example, the main wheel 7a is provided with two stops 27 and 28, and with a wedge 29 which is solidly fixed therebetween and having a gully 30 extending over a portion of its length. A similar wedge 32 of shorter length and having a gully 33 is placed in the opposite direction on the secondary wheel 7b. A friction fitting 35 may be placed between the second wedge 32 and the secondary wheel 7b. A spring 36 is located in the two gullies 30, 33 so as to wedge the two wedges 29 and 32. This arrangement does not oppose movement of the secondary wheel 7b (at the bottom of FIG. 4) towards the left of FIG. 4, but it locks the secondary wheel 7b as it is urged to the right by vibrations. However, the wheel 7b can still move to the right, against a friction force, by virtue of the fitting 35. The spring 25 urges the facing gear wheels in rotation in such a manner as to urge the main wheel 7a into contact with the drive gear wheel 2. The wedging system shown in FIG. 4 does not oppose this movement since the force of the spring 36 is negligible compared with the force of the spring 25. The spring 36 serves only to keep the wedges 29 and 32 applied against each other. If the amplitude A of the oscillating torque exceeds the sum $C_0+C_1$ of the driving torque plus the internal torque due to the springs 25, the springs 25 are urged in compression in such a direction as to cause the teeth of the main wheel 7a to lose contact with the teeth of the driving gear wheel 2. However, this movement is opposed by the FIG. 4 wedging system, thereby ensuring that the teeth remain in contact. The wedge 32 will slide over the wheel 7b only under the effect of a much larger oscillating torque, in which case considerable energy will be dissipated by the friction fitting 35. The friction thus dissipates the vibrational energy as heat, thereby reducing the amplitude of the vibrations. The amplitude of the oscillating torque is thus reduced and can be kept below the average value of the driving torque, plus the internal torque $C_1$ where applicable.

In a preferred implementation of the invention, the input and output shafts (or at least one of them) include respective resilient torsion bars or tuning bars. The two bars 1 and 10 are mounted in the same way to link their repspective gear wheels 2 and 7a to respective sleeves 21 and 12. One end of each resilient bar is fixed in rotation relative to the corresponding gear wheel and its other end is fixed in rotation relative to the corresponding sleeve. The input sleeve 21 receives the driving torque from outside the gear system and the output sleeve 12 delivers torque to a driven unit likewise outside the gear system. Each sleeve is mounted concentrically with a corresponding socket 16 or 23 (the sleeve 21 fits inside the socket 23 while the sleeve 12 fits outside the socket 16). An energy-dissipating fitting in the form of a ring or washer 17, 22 is mounted between each sleeve and the corresponding gear wheel, said sleeve or washer lying in a plane perpendicular to the corresponding axis of rotation or in any other suitable surface of rotation about said axis.

Figure 5:
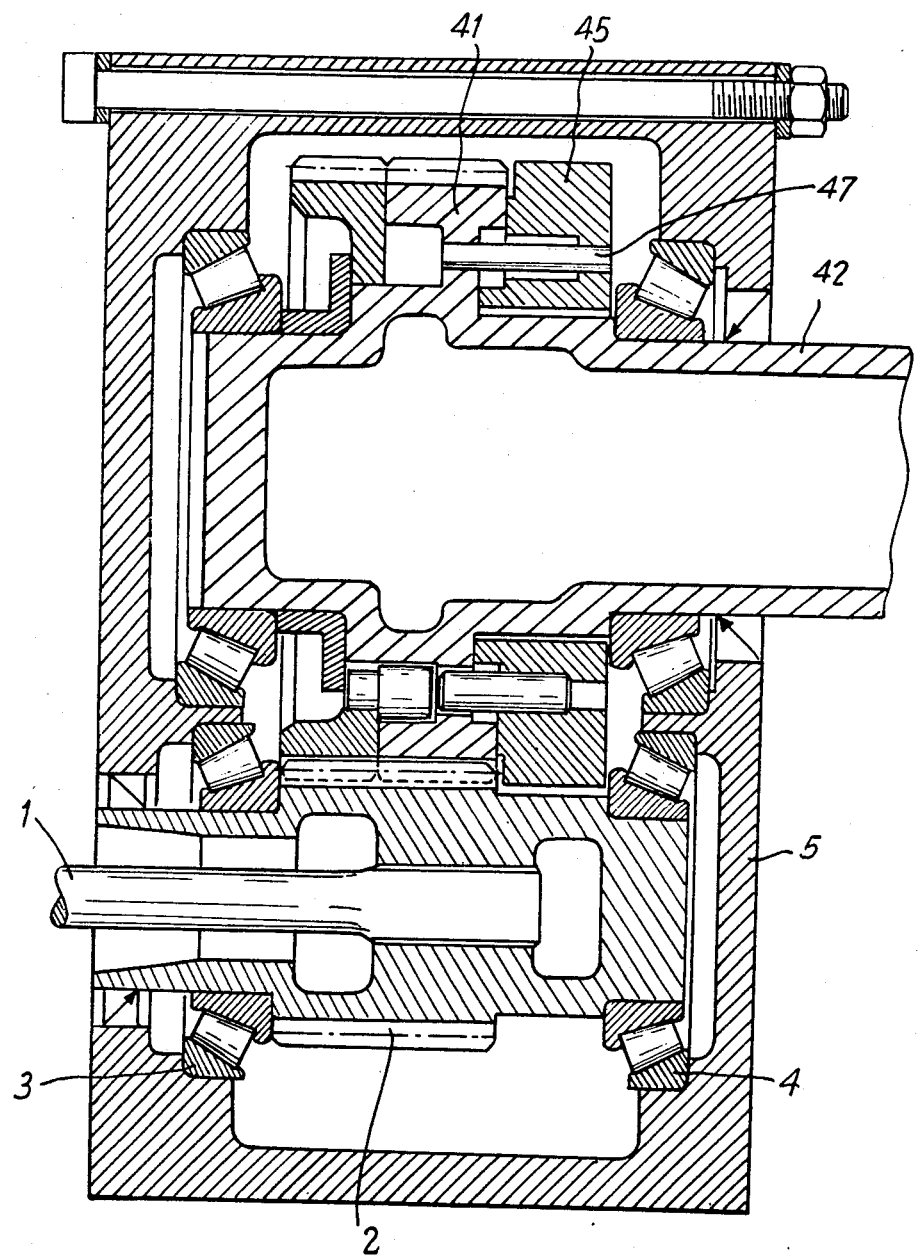
FIG. 5 is a section similar to FIG. 1 showing a variant transmission system.

FIG. 5 shows a variant in which there is only one resilient or tuning bar. The output gear wheel 41 is directly formed on or fixed to the output sleeve 42. The purpose of the tuning bars is as follows:

As is known to the person skilled in the art, a set of shafts and gear wheels constituting a drive train is exposed to oscillatory vibrations including nodes an antinodes. On either side of a vibratory node, the oscillations take place in opposite directions, and consequently the mechanical components which include a vibratory node are generally the components that suffer the most from the vibration. In accordance with preferred embodiments of the present invention, the locations of the nodes may be determined by suitably dimensioning the tuning bars, and each tuning bar is thus so dimensioned as to ensure that is is the seat of a vibration node. The minimum transverse dimensions are naturally chosen so that the tuning bars are nonetheless capable of transmitting the maximum drive torque. The geometry used (see FIG. 1) with its sockets and sleeves gives a wide range of possible choice for the lengths of the tuning bars. The dimensions of the tuning bars can be determined by calculation. In one method of calculation, the drive train is represented by a model, ie. a series of massive disks interconnected by massless torsion springs. This method is fully described in the thesis of Mr. Guy Louradour presented July 9, 1981 before the Université Pierre et Marie Curie in Paris under the title "Contribution à l'étude des arbres, application au vilebrequin" (A contribution on the study of shafts, and application to crankshafts). Said thesis is thus incorporated by reference in the present description. The thesis develops, inter alia, methods of modeling drive trains and of calculating the resonant modes of vibration. All the information required for determining the locations of vibration nodes is to be found therein.

From the model of the drive train, the value of the first resonant frequency (1st mode) is calculated and then the modal deformation due to the first mode is calculated. Critical speeds are then sought. A list of excitations needs to be established. For a reciprocating machine, it is necessary to calculate the magnitudes of the harmonic torques, taking account of the crankshaft linkage and the firing order. A speed is said to be critical if one of the major harmonic torques is at the resonant frequency of the drive train.

If any of the required conditions (ie. vibration node located in the tuning bar(s); essential operating range free from critical speeds) is not satisfied, then the calculations are done again for a tuning bar having one or more dimensions changed.

Once the conditions are satisfied, the speeds which are critical in the second mode need to be examined. Three outcomes are possible:
(1) All the critical speeds are faster than maximum speed. There is then no need to install a second tuning bar;
(2) Some of the critical speeds are less than the maximum speed, but they all lie outside the operating range. It is then necessary to investigate the problem of loss of contact between the meshed teeth and to calculate the amplitude A of the oscillating torque. A second tuning bar will need to be installed if the second vibration node is situated in a fragile component in the drive train;

(3) one or more critical speeds lie in the essential operating range, in which case a second tuning bar is essential. The minimum transverse dimensions of the tuning bar are chosen to be large enough to transmit the maximum torque. With this prior condition satisfied, the tuning bar dimensions are calculated such that:
(a) the critical speeds relating to the second mode do not occur in the essential operating range; and
(b) the node of the second mode is situated in the second tuning bar.

Since the tuning bar is the site of a vibration node when torsion oscillations develop, the sleeve 12 and the wheel 7a oscillate in opposite directions. Friction at the contact surfaces in the ring 17 dissipates the energy. The amplitudes of the vibration are thus reduced.

Once the dimensions for the, or each, tuning bar have been determined, the following are known:
(1) the critical speeds; and
(2) the modal deformations corresponding to said critical speeds.

For each critical speed, the amplitude of the oscillating torque A and the corresponding driving or driven torque $C_0$ are calculated. The worst case situation is sought for loss of contact between the teeth. Two outcomes are possible:
(1) The difference $|A|-C_0>0$ is small, (about 10% of $C_0$) in which case a resilient gear wheel on its own may be sufficient. The springs are designed to be pre-stressed on assembly with a stress which is slightly greater than the difference $|A|-C_0$. The resonant frequency of the backlash takeup gear wheel with the pre-stress springs must be checked to make sure it does not correspond to one of the frequencies of the exciting torques;
(2) The difference $|A|-C_0>0$ is large (greater than 10% of $C_0$). In this case the difference should not be compensated by the pre-stress torque for two reasons:
(a) the high level of the pre-stress torque would reduce the efficiency of the gear train; and
(b) the high pre-stress would require the size of the teeth to be increased.

In this case, the following technical solutions must be considered:
(i) making the backlash takeup gear wheel self-locking;
(ii) mounting an inertial mass adjacent to the gear wheel; and/or
(iii) if the problem lies with second mode vibrations, adjusting the tuning bar to damp the vibrations.

These solutions may be considered independently or in combination. Naturally, the required calculations can be performed by a computer.

The internal springs in the resilient gear wheel serve to continuously take up any backlash or slack. When there is no vibration, a (low value) pre-stress torque $C_1$ is applied to the meshed teeth. When there is vibration, the oscillating torque A will tend to separate the meshed teeth. The resilient secondary wheel then moves relative to the main wheel. The self-locking system opposes any relative maovement tending to separate the meshed teeth. However, it does not oppose any relative movement tending to take up the backlash.

The self-locking system based on the principle of friction between two surfaces can supply a maximum opposing torque $C_2$ which is limited by the friction surface areas and by their coefficients of friction.

1st case:

$$|A|<C_0+C_1+C_2$$

The self-locking system is sufficient.

2nd case:

$$|A|=C_0+C_1+C_2 \text{ or}$$

$|A|$ is slightly greater than $C_0+C_1+C_2$

In this case the torque $C_2$ which the self-locking system can provide is just sufficient. However, the energy required to cause the self-locking system to slide is dissipated by friction. The self-locking system acts as a vibration-damping system.

3rd case:

$$|A|>C_0+C_1+C_2$$

In this case the self-locking system slips and the torsion vibrations are thus considerably damped, thereby tending to reduce the value of A. An inertial mass can thus be used.

FIG. 5 shows a variant transmission system including an inertial mass 45 disposed adjacent to a gear wheel 41. This inertial mass is in the form of a wheel and has no teeth for meshing with any other wheel. It is placed against the gear wheel 41 which is equivalent to the main gear wheel 7a of FIG. 1, and is connected thereto by resilient links 47 which may be constituted by rods or by springs, enabling a degree of relative rotation between the gear wheel and the intertial mass. This arrangement further reduces the amplitude of vibrations and enables loss of contact between meshed teeth to be avoided in situations when other precautions are insufficient. The inertial mass may be calculated using the same model, simply by adding an extra disk.

Finally, an additional precaution consists in pre-stressing the casing by means of tie rods 51 (see FIG. 1).

To summarize, the techniques for avoiding destruction of the teeth by vibration due to torsion are the following:
(1) one or two tuning bars located at one or both ends of the drive train;
(2) pre-stressing the teeth;
(3) a self-locking system for avoiding loss of contact between teeth; and
(4) internal damping by means of an inertial mass to considerably reduce the oscillating torques.

We claim:
1. A mechanical transmission system including a gear train comprising at least one gear wheel constituted by two wheels mounted on a common shaft, said two wheels comprising main gear wheel fixed to the common shaft, said main gear wheel meshing with another gear wheel to transmit driving torque, and a secondary gear wheel for taking up backlash, said secondary gear wheel not being fixed to said common shaft, but meshing with said another gear wheel, means resiliently urging said main gear wheel and said secondary gear wheel to rotate relative to each other in such a manner as to maintain the teeth of said main gear wheel in contact with the teeth of said another gear wheel by setting up an internal torque, the improvement comprising a wedging and friction link provided between said main gear wheel and said secondary gear wheel enabling said secondary gear wheel to rotate freely relative to said main gear wheel in the direction tending to bring the teeth of said main gear wheel into closer contact with the teeth of said another gear wheel, and means for imposing predetermined friction for rotation of said secondary gear wheel in the opposite direction of relative rotation.

2. A system according to claim 1, wherein the wedging and friction link comprises two wedges, means fixing one of said wedges to said main gear wheel and a friction fitting keeping said other wedge separate from said secondary gear wheel and means for resiliently urging the two wedges into a wedging position.

3. A system according to claim 1, further including a drive unit, a driven unit and first and second links connecting said drive unit and said driven unit respectively to said gear train, said gear train including said at least two intermeshed gear wheels, and wherein at least one of said links includes a resilient tuning bar of dimensions so chosen that the tuning bar is the seat of vibration node in operation.

4. A system according to claim 3, wherein said links comprise mechanical parts fixed to opposite ends of the, or each, tuning bar and in frictional contact with one another with an energy-dissipating fitting interposed therebetween.

5. A system according to claim 1, further including an inertial mass constituted by a wheel juxtaposed with one of the gear wheels and connected thereto by resilient means.

* * * * *